United States Patent [19]

Regueiro

[11] E Re. 30,622

[45] Reissued May 26, 1981

[54] FUEL METERING APPARATUS FOR A CARBURETOR

[75] Inventor: José F. Regueiro, Waterloo, Iowa

[73] Assignee: Teledyne Industries, Inc., Los Angeles, Calif.

[21] Appl. No.: 897,659

[22] Filed: Apr. 17, 1978

Related U.S. Patent Documents

Reissue of:

[64] Patent No.: 4,007,721
Issued: Feb. 15, 1977
Appl. No.: 471,345
Filed: May 17, 1974

[51] Int. Cl.[3] ..... F02M 17/18

[52] U.S. Cl. ..... 123/523; 261/121 A; 261/121 B

[58] Field of Search ..... 123/134, 133, 119 D; 137/625.3, 625.38; 261/121 A, 121 B; 251/61.5, 205

[56] References Cited

U.S. PATENT DOCUMENTS

| | | | |
|---|---|---|---|
| 344,724 | 6/1886 | Crosby | 137/625.38 |
| 1,121,137 | 12/1914 | Schoonneker | 123/134 |
| 1,230,777 | 6/1917 | Quandt et al. | 137/625.38 |
| 1,422,343 | 7/1922 | Davies | 137/625.3 |
| 1,679,257 | 7/1928 | Neebe | 137/625.38 |
| 1,802,321 | 4/1931 | Mabel | 261/121 B |
| 1,944,486 | 1/1934 | Bailey | 137/625.38 |
| 2,071,116 | 2/1937 | French | 123/134 |
| 2,430,852 | 11/1947 | Allen | 123/134 |
| 2,650,582 | 9/1953 | Green | 123/134 |
| 2,699,157 | 1/1955 | Heftler et al. | 123/97 B |
| 2,789,802 | 4/1957 | Heftler | 123/97 B |
| 3,364,909 | 1/1968 | Mick | 123/124 R |
| 3,387,830 | 6/1968 | McIlroy | 261/121 B |
| 3,493,217 | 2/1970 | Farley | 261/121 B |
| 3,548,792 | 12/1970 | Palmer | 261/121 B |
| 3,590,793 | 7/1971 | Masaki | 123/124 R |
| 3,601,106 | 8/1971 | Nakjima | 123/119 D |
| 3,659,575 | 5/1972 | Lokka | 123/124 R |
| 3,693,947 | 9/1972 | Masaki | 261/121 A |
| 3,713,429 | 1/1973 | Dwyre | 123/134 |
| 3,764,120 | 10/1973 | Imai | 261/121 B |
| 3,800,533 | 4/1974 | Zankowski | 123/134 |
| 3,861,366 | 1/1975 | Masaki | 261/121 B |
| 3,906,910 | 9/1975 | Szlaga | 261/121 B |
| 3,942,493 | 3/1976 | Linden | 261/121 B |

*Primary Examiner*—Ronald H. Lazarus
*Attorney, Agent, or Firm*—Gifford, VanOphem, Sheridan & Sprinkle

[57] ABSTRACT

An improved fuel metering apparatus for a carburetor which provides an optimum air/fuel ratio at all engine speeds and loads. The air/fuel ratio is adjusted by means of a valve sensitive to intake manifold pressure which modulates the amount of bleed air mixed with the fuel prior to the aerated fuel being introduced into the venturi throat of the carburetor.

13 Claims, 5 Drawing Figures

FUEL METERING APPARATUS FOR A CARBURETOR

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to carburetors of the type used with internal combustion engines. More particularly, the invention is directed to an apparatus for matching the air/fuel ratio delivered by a carburetor to the requirements of an engine operating at various speeds and loads.

2. Description of the Prior Art

Precise air/fuel ratio control, especially on engines operating very lean at part load, is absolutely necessary for good driveability and optimum emissions. When a carburetor is used to mix and meter the air and fuel, it is designed to match as closely as possible the particular requirements of the engine. In addition to a primary fuel metering system which generally comprises an air induction pipe, a venturi throat, a fuel nozzle and a throttle plate, it is not uncommon to employ other systems to tailor the output of the carburetor to the requirements of the engine. For example, choke systems are often incorporated to improve cold starting and running characteristics of the engine, idle systems are used to facilitate low speed engine operation and accelerator pump systems are sometimes used to prevent stalling by injecting an additional quantity of fuel when the throttle plate is rapidly opened.

The primary fuel metering system [is] *in* a carburetor is usually adjusted to deliver an air/fuel ratio which is appropriate for mid-range engine load conditions. Thus, as engine load increases, the air/fuel ratio provided by the primary fuel metering system must be enriched to obtain the most efficient operating conditions. This required engine enrichment is frequently accomplished with a power jet system which at a predetermined point augments the quantity of fuel being delivered at the venturi throat.

A power jet mixture enrichment system can only approximate an engine's requirements. It cannot proportionately respond to increasing engine loads as it is either on or off and is usually adjusted to meet the engine's requirements under maximum load conditions. Generally, at engine loads greater than normal but less than those required to kick in the power jet, the engine is running lean. At loads sufficiently high to actuate the power jet, but less than full power, the engine runs too rich. Because of these inaccuracies associated with metering the fuel, optimum performance is not obtained over the full range of engine operating conditions. This results in higher fuel consumption and higher exhaust emission levels.

In internal combustion engines equipped with carburetors and turbochargers it is desirable to locate the carburetor between the air compressor discharge and the intake manifold as such placement results in superior mixing of the fuel with the air. However, given the present state of the art, it is extremely difficult to so position the carburetor when high load enrichment is obtained with a power jet system having a bleed air feature because at high loads, the compressor "boost" applied through the air bleed creates a high air flow which leans out the mixture at a time when it should be enriched.

SUMMARY OF THE INVENTION

One of the principal objects of the present invention is to provide an improved fuel metering apparatus for a carburetor which is able to deliver the optimum air/fuel ratio to an internal combustion engine over a wide range of speeds and loads. By providing the optimum air/fuel ratio throughout the operating range of an engine, the invention improves performance and reduces fuel consumption while lowering the emission of toxic exhaust pollutants such as carbon monoxide. The invention also provides a fuel metering system that can be used with turbocharged engines and is easily incorporated in a carburetor disposed between the compressor discharge and the intake manifold of the engine.

The present invention accomplishes these diverse objects by monitoring the intake manifold pressure or throttle position (both being functions of engine load and hence mixture requirement) and continuously modulating the quantity of air being bled into the fuel by means of a valve responsive to the manifold pressure or throttle position. The quantity of fuel delivered to the venturi of the carburetor varies inversely with the bleed air and thus this is an effective way to control the air/fuel mixture delivered to the engine.

The many objects and advantages of the present invention will be best understood by those skilled in the art when the following description of the best mode contemplated for practicing the invention is read in conjunction with the accompanying drawings.

BRIEF DESCRIPTION OF THE DRAWINGS

Reference is now made to the accompanying drawings in which like or similar elements appearing throughout the several views are referred to by the same reference characters and in which.

DETAILED DESCRIPTION OF THE PREFERRED EMBODIMENT

Figure 1:
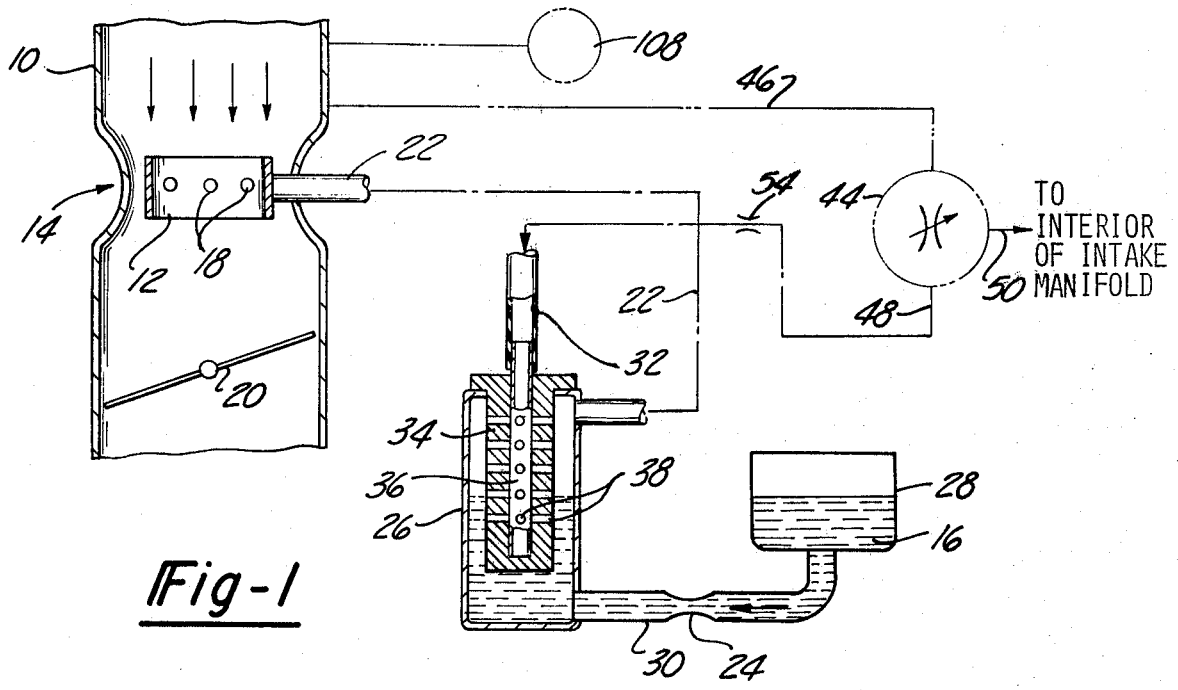
FIG. 1 is a diagrammatic view in partial cross section showing the invention in relationship to other carburetor components.

Reference is now made to FIG. 1 which is a diagram in partial cross section of a carburetion system incorporating the present invention. The system includes an air induction pipe 10 and an air filter (not shown) which is normally positioned on the upper end of air induction pipe. Air is caused to flow through the air induction pipe 10 in the direction of the arrows and passes an annular fuel nozzle 12 (or other conventional fuel discharge means) which is located in a venturi throat 14 of the pipe 10. The flow of air through the venturi throat 14 causes fuel 16 to be drawn through apertures 18 in the fuel nozzle 12. These apertures 18 in the fuel nozzle 12 are in fluid communication with a pipe 22 which in turn communicates with a main fuel metering jet 24 through an emulsifying well 26. The main fuel metering jet 24 is located along a pipe 30 which interconnects the emulsifying well 26 with a fuel bowl 28. A typical butterfly type throttle valve 20 used to control the air flow is shown disposed in the air induction pipe 10 downstream of the venturi throat 14.

Disposed in the emulsifying well 26 is an emulsifying tube 34 having a longitudinal bore 36 and a plurality of passageways 38 which allow fluid communication between the exterior surface of the emulsifying tube 34 and the longitudinal bore 36.

What has been described to now is conventional with present carburetors although of course different versions exist. The present invention is directed to such a system including a bleed air modulator valve shown schematically at 44 in FIG. 1. The bleed air modulator valve 44 is provided with three fluid connections. These fluid connections are represented in FIG. 1 by lines 46, 48 and 50. The line 46 is a fluid connection which supplies filtered air to the bleed air modulator valve 44 preferably from the air induction pipe 10 at a point downstream of the air filter (not shown) and upstream of the venturi 14. The line 48 represents the bleed air output from the modulator valve 44 and is in fluid communication with a bleed air inlet 32 on the emulsifying well 26 through a well vent restrictor 54. The line 50 represents a fluid connection between the interior of the intake manifold of the engine (not shown) and the modulator valve 44. It is apparent that if desired the valve 44 can be mechanically activated by positive linkage to the shaft of the throttle valve 20.

Figure 2:
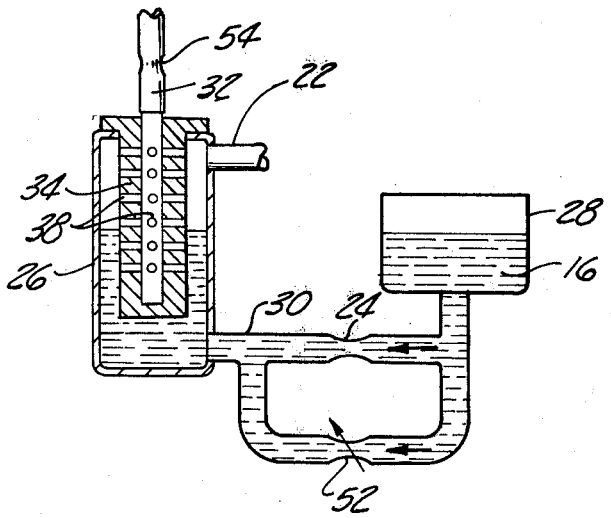
FIG. 2 is a diagrammatic view in partial cross section of a conventional power jet system and a conventional bleed air system for a carburetor.

FIG. 2 shows diagrammatically those elements of a carburetor which are conventionally used to provide a power jet system and a bleed air system. The power jet system comprises a normally closed, auxilliary fuel metering jet 52 in parallel with the main fuel metering jet 24. During normal operation fuel 16 from the fuel bowl 28 flows through the main fuel metering jet 24 in the pipe 30 to the emulsifying well 26. The rate of fuel flow through the pipe 30 is controlled by the diameter of the main fuel metering jet 24. The rate of fuel flowing into the emulsifying well 26 is increased when the fuel is also allowed to flow through the power jet 52. The jet 52 is opened in response to engine load as represented by manifold vacuum or throttle position.

In the conventional construction of a bleed air system shown in FIG. 2 filtered air from the air induction pipe 10 communicates with the inlet 32 on the emulsifying well 26 through a fixed orifice 54 which is used to control the flow of air. The bleed air entering the emulsifying well 26 through the inlet 32 moves down along the inside of the emulsifying tube 34, passes through the apertures 38 into the emulsifying well 26 while mixing with the fuel 16. This air/fuel mixture is then drawn out of the emulsifying well 26 by the vacuum at the venturi throat 14 and flows through the pipe 22 to the annular fuel nozzle 12. A bleed air system of the type herein described is used to preliminarily mix the air and the fuel prior to this mixture being introduced into the venturi throat 14 of the air induction pipe 10 and secondarily to affect some degree of air/fuel ratio control by uncovering more air holes 38 as the fuel level drops with increasing load and/or speed, thus further leaning out the mixture.

Figure 3:
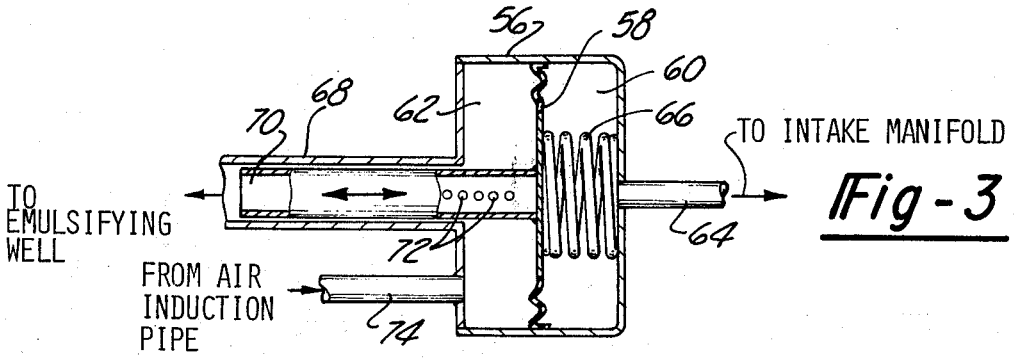
FIG. 3 is a [cross sectional] *cross-sectional* view of an intake manifold pressure sensing and bleed air modulating valve of the present invention.

FIG. 3 shows a first embodiment of a manifold pressure sensitive bleed air modulator valve of the type identified schematically in the broken circle 44 of FIG. 1 and it replaces both the bleed air system and the power jet system shown in FIG. 2. The valve 44 comprises a cyclindrical housing 56 in which is disposed a diaphragm 58 which divides the interior of the housing into a vacuum chamber 60 and an air chamber 62. The vacuum chamber 60 is provided with an inlet pipe 64 which corresponds to the line 50 of FIG. 1 and is therefore connected with the intake manifold of the engine. A compressible coil spring 66 or other biasing means is interposed between the diaphragm 58 and the housing 56 and is biased to expand the volume of the vacuum chamber 60 by forcing the diaphragm 58 to the left. An air inlet pipe 74 is integrally attached to the vacuum diaphragm housing 56. The pipe 74 corresponds to line 46 of FIG. 1 and is therefore connected to the induction pipe 10 upstream of the venturi 14. The longitudinal axis of the exhaust pipe 68 is perpendicular to and passes through the center of the diaphragm 58. A movable tubular regulating valve 70 is telescopically disposed and slidably movable within the end of the exhaust pipe 68. The valve 70 and the exhaust pipe 68 are close fitting. One end of the regulating valve 70 is integral with the diaphragm 58. A plurality of critically spaced and dimensioned apertures 72 is provided above the length of the valve 70. These apertures 72 are sequentially covered and uncovered as the diaphragm 58 moves back and forth causing the valve 70 to slide in and out of the exhaust pipe 68. The end of the tubular valve 70 opposite the diaphragm 58 is open. The outlet pipe 68 corresponds to the line 48 of FIG. 1 and is thus connected to the inlet 32 of the emulsifying well 26 through the well vent 54.

The valve shown in FIG. 3 is for part-time operation, since it only controls the air/fuel ratio over a part of the engine's load range. This embodiment in essence replaces the functions of the hereinbefore described power jet system. In so doing, it provides better control of the air/fuel ratio, and allows the high load control function to be matched exactly to the requirements of the engine and/or the wishes of the engine developer. With limitations it also replaces part of the functions of a vacuum operated accelerating pump.

Figure 4:
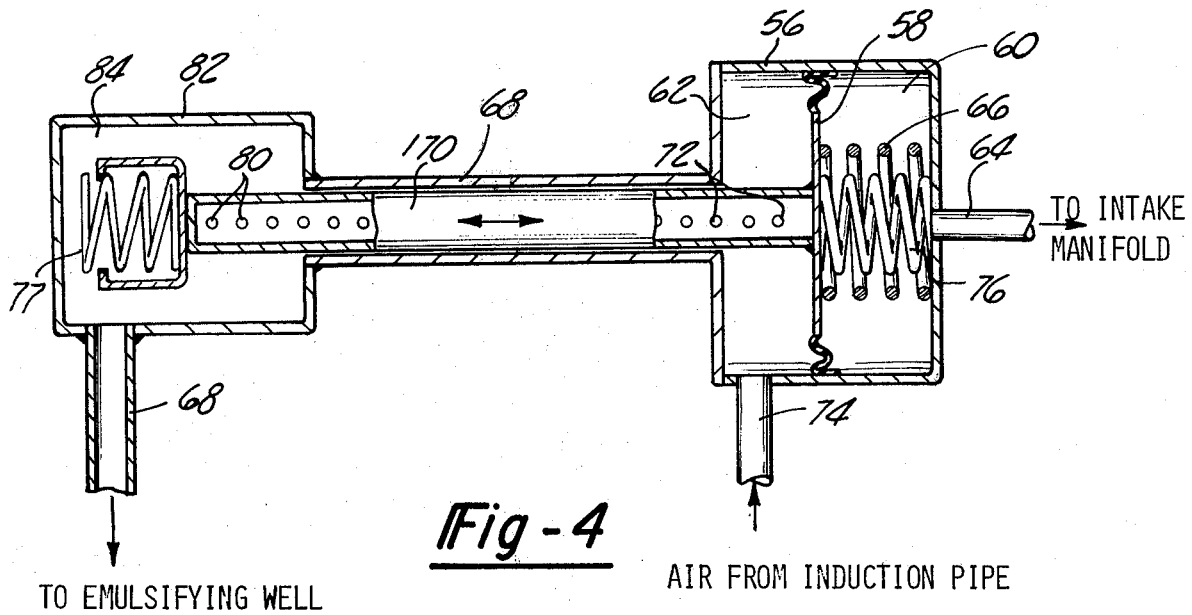
FIG. 4 is a [cross sectional] *cross-sectional* view of an alternative embodiment of the valve shown in FIG. 3.

A second embodiment of a manifold pressure sensitive bleed air modulator valve of the present invention is shown in FIG. 4. This embodiment is adapted to operate over an extended range of engine speeds and loads. It differs from the valve shown in FIG. 3 in that the end of the movable tubular regulating valve 170 which is not integrally attached to the diaphragm 58 is provided with an end wall 78 and a plurality of critically spaced and dimensioned apertures 80 are disposed adjacent the wall 78. Additionally, an auxilliary housing 82 is integrally disposed at the end of a tubular valve housing 168 forming an auxilliary chamber 84 in which the regulating valve 170 may reciprocate. The outlet pipe 68 is connected with the auxilliary chamber 84. An optional coil biasing spring 76 is shown coaxially disposed within the coil spring 66 to provide a predetermined composite spring response. Multiple springs can also be used if desired to tailor the response of the FIG. 3 embodiment.

Figure 5:
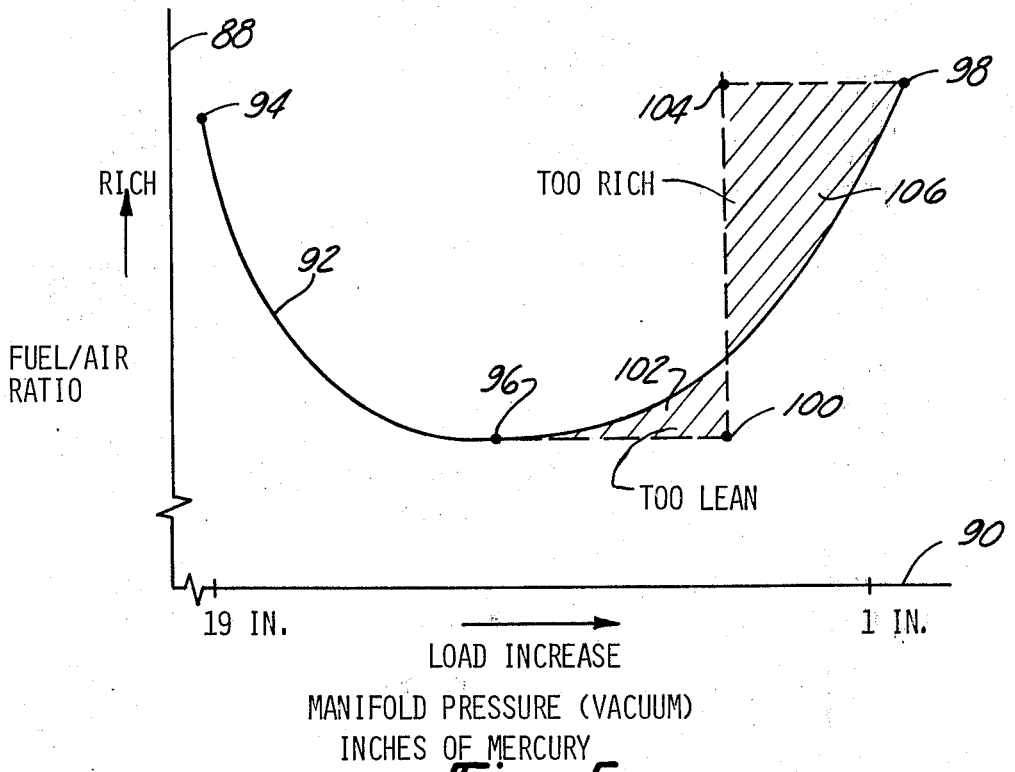
FIG. 5 is a graph depicting the air/fuel curve for an engine which the device of the present invention is capable of tracking.

In FIG. 5, the relative fuel/air ratio is shown increasing from bottom to top along the vertical axis 88. The intake manifold vacuum measured in inches of mercury is shown decreasing from left to right long the horizontal axis 90. This decrease in manifold vacuum is associated with less throttle plate restriction and higher engine loads. The curve represented by solid line 92 represents the optimum air/fuel ratio over a wide range of operating conditions. The apparatus of this invention is capable of tracking this curve. The optimum air/fuel ratio for engine starting is shown at point 94. A leaner mixture is required under normal operating conditions shown at point 96. Point 98 shows that a rich mixture is required under maximum load conditions.

The apparatus of this invention and a well designed conventional carburetor are both able to track the curve 92 between the optimum starting conditions at point 94 and the normal operating conditions shown at point 96. Past the point 96 a conventional carburetor equipped with a main fuel metering system delivers a mixture which follows the dashed line to the point 100. A shaded area 102 highlights the disparity between the engine's requirements and the inadequate mixtures being supplied by a conventional carburetor. If the carburetor is not equipped with a mixture enrichment system then it is impossible to obtain the maximum power from the engine. Conventional carburetors equipped with power jet systems may or may not track the curve from point 94 to point 96 and then deliver a lean mixture up to the point 100 when the power jet kicks in and immediately provides a mixture indicated by the point 104 which is too rich for the engine's requirements. The delivery of this overrich mixture takes place at manifold vacuums between 3 to 7 in. Hg. and continues until the engine is operating at maximum power which is indicated at point 98. The shaded area 106 highlights the excessively rich mixture delivered by a conventional power jet system.

Referring now to FIGS. 1 and 3 for a description of the operation of the present invention, when starting the engine the regulating valve 70 is positioned all the way to the left by the spring 66 and the apertures 72 are closed as desired by the outlet pipe 68. When the valve is in this position, air flow from the induction pipe 10 is either cut off or restricted, as desired from entering the bleed air inlet 32 on the emulsifying well 26. The air/fuel mixture is now suitable for starting (enriched). As the engine starts the manifold vacuum increases, moving the diaphragm 58 to the right and drawing the valve 70 with it. This movement uncovers the apertures 72 in the valve 70 and air passes from the air induction pipe 10 through the inlet 74, through apertures 72 into the hollow valve 70, out the pipe 68 (48 in FIG. 1) through the restrictor (well vent) 54, into the emulsifying tube 36 through apertures 38 mixing with the fuel, through the pipe 22, and finally into the venturi throat 14 and the nozzle 12. During light duty operation the valve 70 is positioned all the way to the right by the manifold vacuum actuating the diaphragm 58 against the spring 66. During this range of operation, the air/fuel ratio is controlled in the normal fashion, that is, by the restrictor 54 and the size and location of the apertures 38 in the emulsifying tube 34, with the apertures 72 in the valve 70 acting as a fixed air orifice. This leans out the air/fuel mixture from that existing at the starting condition, in the appropriate rate for each particular part load condition.

As the load increases to the point where it is desirable to start enriching the mixture, manifold vacuum decreases and the spring 66 moves the diaphragm 58 and the valve 70 to the left. This movement covers some of the apertures 72 which restricts the flow of air through the outlet pipe 68 into the emulsifying well 26 which progressively enriches the air/fuel mixture or compensates from the ever increasing tendency to lean out which is inherent in the basic design of systems with fixed restrictors. As the engine load increases, the valve 70 is moved further to the left until at maximum power (point 98 shown on the graph in FIG. 5) the apertures 72 are covered in the desired fashion to either cut off air bleed entirely or to allow the desired amount. By proper sizing and positioning of the apertures 72 in the valve 70, or by using a variable rate spring 66, or a variable area diaphragm 58, it is possible to obtain the desired air/fuel ratio at the high load condition covered by the actuation of this device.

Referring now to FIGS. 1 and 4, the operation of the present embodiment is similar to the operation of the embodiment hereinbefore described except that a dual set of air flow regulating apertures 72 and 80 are provided at both ends of the regulating valve 70 which allows more precision in the metering of the bleed air. Operation of the modulator of FIG. 4 is continual so that the device operates as a full-time control over the total load range of the engine.

With the embodiment of FIG. 4 the diaphragm 58 is also positioned all of the way to the left by springs 66 and 76 upon starting the engine. In this position of the diaphragm 58 the apertures 72 are totally or partially covered and therefore communication between the bleed inlet 74 and the outlet 68 is closed or highly restricted. Since little or no air is delivered to the emulsifying well 26 an enriched mixture is delivered to the fuel nozzle 12 for starting the engine.

As the engine starts and manifold vacuum increases the diaphragm 58 moves to the right to a position dependent upon the increase in manifold pressure. Air is now delivered from inlet 74 through apertures 72 and 80 to the outlet 68. The rate of air flow to outlet 74 is dependent upon the size, location and number of apertures 80 and 72 which are uncovered and thus upon manifold pressure.

Further[,] leaning out of the mixture can be achieved for part load conditions by disposing the springs 76 so that the valve 170 will start moving to the left with small decreases in manifold vacuum as would result from light increases in load. In this manner the air/fuel ratio can be leaned out to a point such as 96 in FIG. 5, nearly corresponding to the largest total area opened by a combination of apertures 72 and 80. From this point, if it is desirable to start enriching the mixture to accommodate higher loads, further throttle opening resulting in manifold vacuum decreases causes further movement of the diaphragm 58 and the valve 170 to the left. In this way the so-called "fuel hook" or air/fuel ratio to engine load curve (FIG. 5) can be tailored exactly to the requirements of the engine.

As manifold [pressures] *pressure* varies with variation in load, the diaphragm 58 continually moves back and forth to provide the optimum fuel/air ratio called for by the engine.

It has been found that the apparatus of the present invention acts as an anti-stall device especially when used in conjunction with venturis of relatively small size. If the engine is running at a particular speed and the load increases, the engine speed drops and the manifold vacuum decreases. In a normal construction, especially if the engine is operating at very lean air/fuel ratios, the engine would stall because not enough fuel can be pulled into the intake manifold. In the construction of the present invention, the air manifold diaphragm moves to a closed position and this provides a richer mixture which avoids stalling.

When an internal combustion engine equipped with a conventional carburetor system is coupled with a turbocharger (as illustrated in phantom in FIG. 1 at 108) having its compressor discharge upstream of the carburetor, the conventional power jet and bleed air systems do not function properly. When the engine is required to deliver high power the power jet system kicks in and the compressor begins to create a positive manifold pressure. The fixed bleed air inlet orifice 54 is designed to properly control the air flow only at normal atmospheric pressures. The compressor 108 actually forces excessive quantities of air through the bleed air inlet 32 into the emulsifying well 26 excessively leaning the air/fuel mixture.

The fuel metering system of the present invention allows the proper positioning of the carburetor between the air compressor 108 and the inlet manifold while providing the desired air/fuel ratio without detrimental effects. It will be understood by those familiar with the art that the apparatus must be "matched" to these turbocharged operations, by proper positioning and sizing of the apertures in the regulating valve 70, and by proper selection of the spring 66 or, if preferred by providing a spring 77 as shown in FIG. 4. An additional spring 76 may be required according to the application, for proper air/fuel ratio modulation during the periods when the engine operates with a positive pressure in the intake manifold. If so desired, the apparatus can also be used as a "power limiter" if the valve 70 is prevented from restricting the flow of all bleed air through the apertures 72, thus allowing a controlled and limited amount of bleed air into the emulsifying well 26. In this fashion, the maximum amount of fuel drawn by the engine can be controlled and the engine power can be effectively checked.

Although an air valve means has been described which utilizes a diaphragm responsive to manifold pressure it should be apparent that other means sensing engine load and operating the air valve in response to changes in such load could be used as well. It should also be understood that the system of the present invention could with modifications be used to regulate air/fuel flow in a fuel injection system rather than the carburetor system shown.

It will also be understood by those familiar with the art, that the device of the present invention can also be used with a natural gas or LPG carburetor, either as an air modulator or fuel modulator, or both, to provide the correct air/fuel ratio, as desired.

It should also be understood that an air modulator of the present invention could be provided with appropriate means, such as an aneroid or temperature sensing means, to regulate the air/fuel ratio in response to changes in altitude or temperatures.

Although the system of the present invention has been described with the pipe 68 connected to the emulsifying well 26 and the pipe 74 connected to the air induction pipe 10 it should be understood that these connections can be reversed. With such reversed connections air from the induction pipe 10 would pass through the apertures 72, the chamber 62 and the pipe 74 to the emulsifying well 26.

The system of the present invention is provided with relatively large fuel and air apertures. This reduces the likelihood of clogging and reduces manufacturing costs by diminishing the need to adhere to close tolerances. The relatively rugged design with few operating parts also reduces such costs while at the same time reducing maintenance requirements.

From the foregoing detailed description it will be evident that there are a number of changes, adaptations, and modifications of the present invention which come within the province of those skilled in the art, however, it is intended that all such variations not departing from the spirit of the invention be considered as within the scope thereof as limited solely by the appended claims.

I claim:

1. In combination: an internal combustion engine having an intake manifold, an air induction pipe, a venturi throat disposed within said air induction pipe, a fuel reservoir, a fuel nozzle means connecting said fuel reservoir and said fuel nozzle means including an emulsifying well disposed intermediate said fuel reservoir and said fuel nozzle means, said fuel nozzle means disposed in said venturi throat for introducing fuel into a stream of air flowing through said air induction pipe, said emulsifying well including a passage means for directing air into the fuel whereby the fuel delivered to said venturi throat is mixed with air.

means in communication with the interior of said intake manifold for sensing the pressure therein; and valve means connected intermediate said air induction pipe, upstream of said fuel nozzle means, and said emulsifying well, said valve means being connected to and responsive to said manifold pressure sensing means to regulate air flow through an outlet to said emulsifying well to decrease the amount of air introduced into said fuel upon a predetermined increase in the pressure in said intake manifold and to increase the amount of air introduced into said fuel upon a predetermined decrease in the pressure in said intake manifold whereby a predetermined optimum air/fuel mixture is provided for said internal combustion engine over a wide range of engine speeds and loads said valve means comprising a tubular member having apertures therein connecting the interior thereof in the area adjacent said manifold pressure sensing means to said outlet.

2. The improved fuel metering apparatus described in claim 1 wherein said manifold pressure sensing means is a vacuum diaphragm unit.

3. The fuel metering apparatus as defined in claim 1 and in which said valve means comprises a housing defining a first chamber and a second chamber separated by a diaphragm, means connecting said second chamber to the intake manifold of an internal combustion engine whereby said diaphragm is actuated in response to changes in the manifold pressure of said engine, an inlet connecting said first chamber with a source of air and said outlet connected with said emulsifying well and said valve member carried by said diaphragm and operable to variably regulate air flow through said outlet in response to movement of said diaphragm.

4. The fuel metering apparatus as defined in claim 3 and in which said valve member extends into said outlet.

5. The fuel metering apparatus as defined in claim 4 and in which said valve member further comprises a tubular member open at the end toward said outlet.

6. The fuel metering apparatus as defined in claim 4 and in which said valve member further comprises a tubular member closed at the end toward said outlet.

7. The fuel metering apparatus defined in claim 1 and including a turbocharger having its compressor discharge upstream of the fuel nozzle.

*8. A fuel metering system for an internal combustion engine, said system comprising an air induction pipe, a fuel reservoir, a fuel nozzle means fluidly connected with said fuel reservoir, a fuel/air mixing means fluidly connected with said fuel nozzle, said fuel nozzle means disposed in said air induction pipe for introducing a fuel/air mixture fuel into a stream of air flowing through said air induction pipe,*

*means for sensing engine operation conditions,*

*variable valve means fluidly connected with said fuel/air mixing means, to vary the amount of air introduced into said fuel in said fuel/air mixing means, said valve means being operatively connected to and responsive to said means for sensing engine operating conditions, said valve means further comprising a housing having an interior chamber, an air inlet connected to said interior chamber and conduit means for connecting said interior chamber with said fuel/air mixing means, a portion of said conduit means adjacent said housing forming a tubular valve seat, a tubular valve member having a plurality of longitudinally spaced apertures formed therethrough, said valve member being longitudinally slidably engaged with said valve seat so that the number of apertures in the valve member open to both the interior of the valve seat and the interior chamber is dependent upon the longitudinal position of the valve member with respect to the valve seat, wherein said sensing means is connected to and controls the longitudinal position of said valve member.*

*9. A fuel metering system for an internal combustion engine, said system comprising an air induction pipe, a fuel reservoir, a fuel nozzle means fluidly connected with said fuel reservoir, fuel/air mixing means fluidly connected with said fuel nozzle means, said fuel nozzle means disposed in said induction pipe for introducing fuel into a stream of air flowing through said air induction pipe,*

*means for sensing ambient conditions, and*

*valve means for varying the amount of air introduced into said fuel upon a change in the ambient conditions as sensed by said ambient condition sensing means, said valve means further comprising a housing having an interior chamber, an air inlet connected to said interior chamber and conduit means for connecting said interior chamber with said fuel/air mixing means, a portion of said conduit means adjacent said housing forming a tubular valve seat, a tubular valve member having a plurality of longitudinally spaced apertures formed therethrough, said valve member being longitudinally slidably engaged with said valve seat so that the number of apertures in the valve member open to both the interior of the valve seat and the interior chamber is dependent upon the longitudinal position of the valve member with respect to the valve seat, wherein said sensing means is connected to and controls the longitudinal position of said valve member.*

*10. A fuel metering system for an internal combustion engine, said system comprising an air induction pipe, a venturi throat disposed within said air induction pipe, a fuel reservoir, a fuel/air mixing means fluidly connected with said fuel reservoir, fuel nozzle means fluidly connected with said fuel/air mixing means whereby a fuel/air mixture is delivered to said fuel nozzle means, said fuel nozzle means disposed in said venturi throat for introducing said fuel/air mixture into a stream of air flowing through said air induction pipe,*

*means for sensing engine operating conditions,*

*valve means connected intermediate said air induction pipe and said air mixing means, upstream of said fuel nozzle means, to vary the amount of air introduced into said fuel in accordance with a variation in the operating conditions of said engine, said valve means further comprising a housing having an interior chamber, an air inlet connected to said interior chamber and conduit means for connecting said interior chamber with said fuel/air mixing means, a portion of said conduit means adjacent said housing forming a tubular valve seat, a tubular valve member having a plurality of longitudinally spaced apertures formed therethrough, said valve member being longitudinally slidably engaged with said valve seat so that the number of apertures in the valve member open to both the interior of the valve seat and the interior chamber is dependent upon the longitudinal position of the valve member with respect to the valve seat, wherein said sensing means is connected to and controls the longitudinal position of said valve member.*

*11. A fuel metering system for an internal combustion engine, said engine having an intake manifold, said system comprising an air induction pipe, fuel/air mixing means and means fluidly connecting said fuel/air mixing means with said air induction pipe, means introducing air into said fuel/air mixing means and including valve means operable when actuated to vary the rate of air delivered to said fuel/air mixing means, and means sensing changes in engine operating conditions and actuating said valve means to regulate the rate of air delivered to said fuel/air mixing means in accordance with changes in the operating conditions of said engine, said valve means further comprising a housing having an interior chamber, an air inlet connected to said interior chamber and conduit means for connecting said interior chamber with said fuel/air mixing means, a portion of said conduit means adjacent said housing forming a tubular valve seat, a tubular valve member having a plurality of longitudinally spaced apertures formed therethrough, said valve member being longitudinally slidably engaged with said valve seat so that the number of apertures in the valve member open to both the interior of the valve seat and the interior chamber is dependent upon the longitudinal position of the valve member with respect to the valve seat, wherein said sensing means is connected to and controls the longitudinal position of said valve member.*

*12. The system as defined in claim 11 and in which said engine condition sensing means comprises means sensing the manifold pressure of said engine.*

*13. The invention as defined in claim 11 wherein said valve member is slidably received within the interior of the valve seat.*

* * * * *

UNITED STATES PATENT AND TRADEMARK OFFICE

CERTIFICATE OF CORRECTION

PATENT NO. : Re. 30,622

DATED : May 26, 1981

INVENTOR(S) : Jose F. Regueiro

It is certified that error appears in the above-identified patent and that said Letters Patent are hereby corrected as shown below:

Column 9, line 15, delete "operation" and insert --operating-- therefor.

Signed and Sealed this

*Twenty-fifth* Day of *August 1981*

[SEAL]

*Attest:*

GERALD J. MOSSINGHOFF

*Attesting Officer*

*Commissioner of Patents and Trademarks*